(12) United States Patent
Endresen et al.

(10) Patent No.: US 9,223,547 B1
(45) Date of Patent: Dec. 29, 2015

(54) AUDIO INPUT FOR STRUCTURED LANGUAGES

(71) Applicant: AMAZON TECHNOLOGIES, INC., Reno, NV (US)

(72) Inventors: Geoffrey Eric Endresen, Everett, WA (US); Brian Scott Cripe, Seattle, WA (US); John Gilbert Focht, Kirkland, WA (US); Craig Vincent Kulfan, Bainbridge Island, WA (US); Bala Anirudh Kurakula, Bellevue, WA (US); Ian Aird Mosher, Seattle, WA (US); Viraj Vijay Sanghvi, Seattle, WA (US); Daniel Arthur Sommerfield, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/855,262

(22) Filed: Apr. 2, 2013

(51) Int. Cl.
*G06F 9/44* (2006.01)

(52) U.S. Cl.
CPC .... *G06F 8/31* (2013.01); *G06F 8/30* (2013.01)

(58) Field of Classification Search
None
See application file for complete search history.

(56) References Cited

U.S. PATENT DOCUMENTS

| | | | | |
|---|---|---|---|---|
| 5,821,508 A | * | 10/1998 | Willard | 235/51 |
| 2008/0306740 A1 | * | 12/2008 | Schuck et al. | 704/275 |
| 2010/0281475 A1 | * | 11/2010 | Jain et al. | 717/172 |
| 2014/0109046 A1 | * | 4/2014 | Hirsch et al. | 717/120 |

OTHER PUBLICATIONS

Stefik et al., On the Design of an Educational Infrastructure for the Blind and Visually Impaired in Computer Science, in Proceeding of the 42$^{nd}$ ACM technical symposium on Computer Science Education, SIGCSE '11, 2011, pp. 571-576.*
Clarke et al., Driving Semantic Parsing from the World's Response, in Proceedings of the Fourteenth Conference on Computational Natural Language Learning (CoNLL '10), 2010, pp. 18-27.*
Rudd, Using Python to Code by Voice, Youtube Video, https://www.youtube.com/watch?v=8SkdfdXWYal, Mar. 20, 2013.*
Arnold et al, "Programming by Voice, Vocal Programming", Proceedings of the fourth international ACM conference on Assistive technologies, 2000, pp. 149-155.*
Sánchez, et al., "APL: Audio Programming Language for Blind Learners", VII Congreso Iberoamericano de Informática Educativa, Oct. 13, 2004, Retrieved from Internet: <URL:http://www.c5.cl/audio/docs/RIBIE2004/RIBIE2004_paper1_APL.pdf>, 11 pgs.

* cited by examiner

*Primary Examiner* — Wei Zhen
*Assistant Examiner* — Timothy Duncan
(74) *Attorney, Agent, or Firm* — Lindauer Law, PLLC

(57) ABSTRACT

Techniques are described for generating text in a structured language, such as source code in a programming language, based on audio input. Audible tokens may be associated with higher-level constructs, including design elements such as methods, classes, design patterns, and so forth. Additionally, audible tokens may be associated with lower-level syntactic constructs of a programming language, such as programming language keywords, tokens, and so forth. Techniques may receive and parse the audio input including the audible tokens, and generate source code output. Techniques may also provide audio information indicating a development context that may otherwise be indicated visually in a development environment.

20 Claims, 9 Drawing Sheets

AUDIO INPUT FOR STRUCTURED LANGUAGES

BACKGROUND

Traditionally, computer programs have been written by developers typing source code into word processing software or into a development environment, while seated at a workstation that includes a keyboard and a monitor. However, this method of software development may not be amenable to developers who prefer other styles of work, such as talking instead of typing. Moreover, because the traditional method of software development requires at least some fluency in a programming language, it may present a challenge to individuals who are neophyte programmers, hobbyists, or who may lack knowledge of programming languages.

Figure 1:
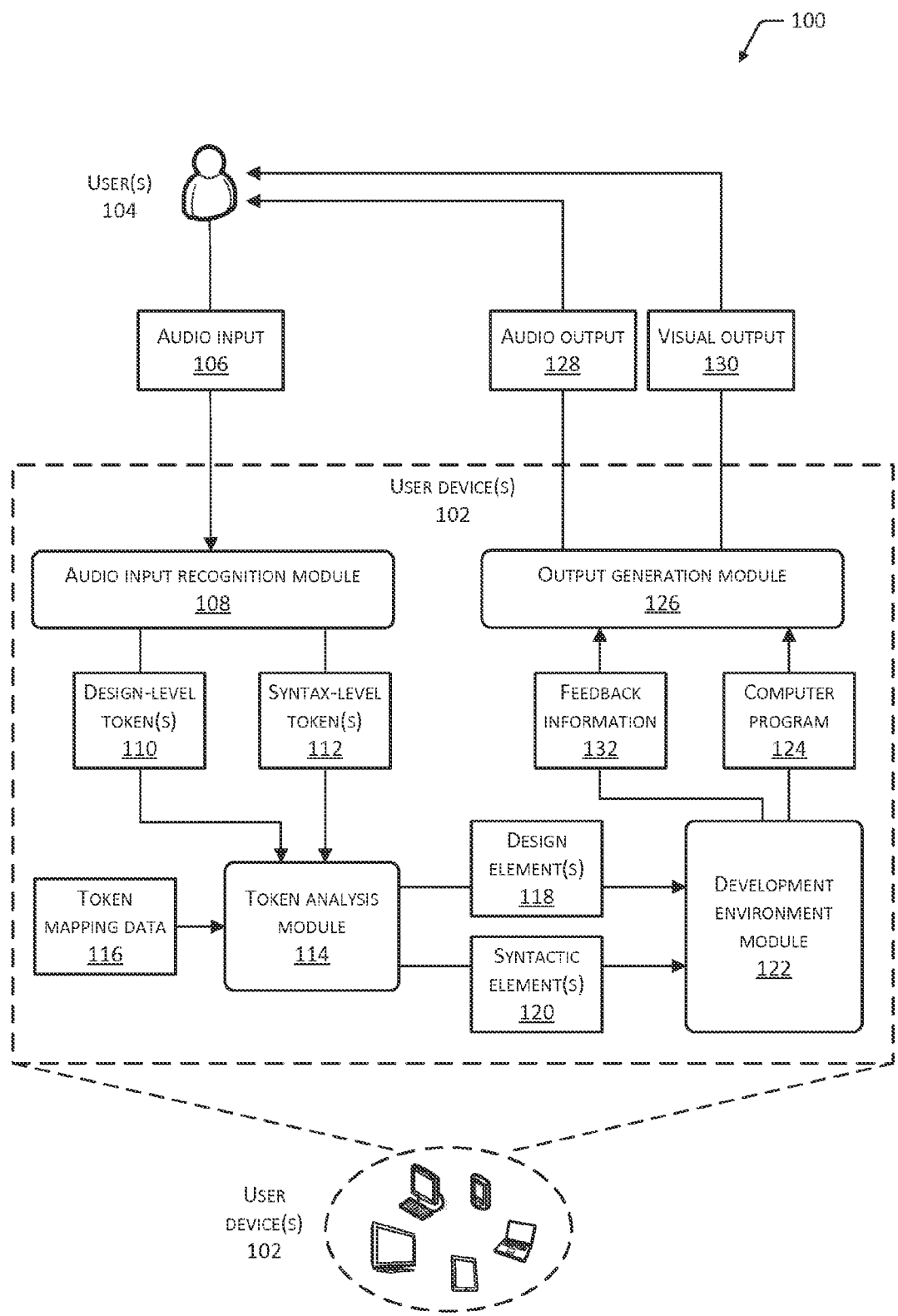
FIG. 1 depicts an environment including a user device configured to receive and analyze audio input that includes design-level and syntax-level information describing a sequence in a structured language, such as a computer program in a target programming language.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for analyzing audio input to identify one or more audible tokens included in the audio input, employing the audible tokens to generate a sequence in a structured language, and providing audio output, visual output, or both audio and visual output describing at least a portion of the generated sequence. As used herein, audible tokens refer to words, phrases, audible constructs, or other types of sound patterns that are included in the audio input received from one or more users. The audio input may be parsed to extract one or more audible tokens that are elements of the audio input. Each audible token may be mapped to at least one element to be included in a structured language sequence such as a computer program.

The audible tokens may be associated with at least two different levels for specifying a sequence: a design level and a syntax level. Audible design-level tokens may identify higher-level design elements to include in the sequence. Audible syntax-level tokens may identify lower-level syntactic elements to include in the sequence. Design-level tokens and syntax-level tokens are described further below. In some cases, the audio input may be received from a user speaking into an audio input component of a user device, or another device configured to receive audio input.

Implementations may also provide output that describes at least a portion of the generated sequence, and that provides feedback describing errors, inconsistencies, or unidentified tokens in the audio input. Implementations support audio output, visual output, or both audio and visual output. In some implementations, the output may include one or more context indicators that indicate a development context related to the portion of the sequence currently being described in the audio output.

Implementations generate a sequence in a structured language by analyzing audio input. As used herein, a structured language may refer to a constructed language that has been consciously designed or developed by an individual or a group of individuals. A structured language may also refer to a formal language such as that used in mathematics, logic, engineering, science, economics, computer science, or in other settings. In some cases, structured languages may be distinguished from natural or ordinary languages, such as English, Hindi, Korean, Tagalog, Swahili, and so forth.

In some implementations, the sequence of the structured language may be at least a portion of a computer program described using a programming language. Implementations may provide for the generation of other types of structured language sequences, such as a series of driving instructions, instructions for performing tasks related to financial transactions (e.g., stock trading), instructions for performing operations associated with e-commerce, instructions to implement a recipe, or instructions for performing other types of operations.

Structured languages may include programming languages such as C, C++, C#, Java, javaScript, BASIC, Visual BASIC, FORTRAN, Perl, Lisp, Ruby, Python, COBOL, Smalltalk, Pascal, Objective-C, and so forth. Implementations support programming languages that are interpreted programming languages, for which source code is executable by an interpreter, scripting engine, runtime application, virtual machine, emulator, or another process. Implementations also support compiled programming languages, for which source code is compiled by a compiler, and linked by a linker, to generate a computer-executable binary version of the program.

FIG. 1 depicts an environment 100 including one or more user devices 102. The user device(s) 102 may be operated by, or otherwise associated with, one or more users 104. The user(s) 104 may generate audio input 106, e.g., in the form of speech by the user(s) 104, and the audio input 106 may be received by the user devices(s) 102. The user device(s) 102 may be configured to analyze the audio input 106 to generate a sequence in a structured language, such as a computer program in a target programming language. In some cases, the user(s) 104 may be members of a software development team, such as developers, testers, program managers, and the like. Other types of user(s) 104 may also employ the user device(s) 102 to generate structured language output based on the audio input 106.

The user device(s) 102 may be any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example of the user device(s) 102 is described further with reference to FIG. 2.

In some implementations, the user device(s) 102 include an audio input recognition module 108. The audio input recognition module 108 may include one or more hardware or software components that operate to receive the audio input 106 and to extract textual data based on an analysis of the audio input 106. In some implementations, the audio input recognition module 108 may include speech recognition software.

The audio input recognition module 108 may be configured to recognize and extract at least two types of tokens present in the audio input 106: design-level token(s) 110 and syntax-level token(s) 112. As used herein, the design-level token(s) 110 may include tokens or constructs that are associated with design-level elements in the structured language for which a sequence is to be generated. For example, in cases where source code is to be generated in a target programming language, the design-level token(s) 110 may be associated with design elements supported by the target programming language, such as classes, objects, structures, libraries, methods, functions, design patterns, transforms, and so forth.

As used herein, the syntax-level token(s) 112 may include tokens or constructs that are associated with syntax-level elements in the structured language. For example, in cases where source code is to be generated in a target programming language, the syntax-level token(s) 112 may include keywords supported by the grammar or syntax of the language (e.g., "for", "next", "if", "then", "try", "catch", "return", "int", "float", "double", and so forth). The syntax-level token(s) 112 may also include other types of tokens supported by the grammar or syntax of the language, including tokens that indicate a beginning or end of a class or a method (e.g., left curly brace "{" or right curly brace "}"), tokens that indicate an end of a statement (e.g., semi-colon ";", return character, or newline character), tokens that indicate a level of hierarchy within a structure, class, method, or function e.g., tab character), tokens that indicate a beginning or end of a set of input parameters to a method or function call (e.g., left parenthesis "(" or right parenthesis ")"), or other types of tokens.

In some cases, at least some of the design-level tokens 110 or the syntax-level tokens 112 may be terms that are not present in a natural language such as English. Such terms may be coined for use by user(s) 104 employing implementations to generate the structured language sequence (e.g., the computer program).

In some implementations, the design-level tokens 110 and the syntax-level tokens 112 extracted from the audio input 106 may be provided to a token analysis module 114. The token analysis module 114 may employ token mapping data 116 to determine one or more design elements 118, each corresponding to one of the design-level token(s) 110. The token analysis module 114 may also employ the token mapping data 116 to determine one or more syntactic elements 120, each corresponding to one of the syntax-level token(s) 112. Operations of the token analysis module 114 to determine the design element(s) 118 and the syntactic element(s) 120 are described further with reference to FIGS. 6 and 7.

In some implementations, the token mapping data 116 may be based at least in part on a calibration of the token analysis module 114 to one or more particular users 104. In some cases, the design-level token(s) 110 or syntax-level token(s) 112 spoken by a particular user 104 may include one or more mnemonics, abbreviations, or other constructs that are employed by that user but that may not be used by other users. To interpret such tokens that are used by a particular user 104, implementations may include a calibration phase in which a user 104 may be prompted to speak a calibration sequence in the structured language. One or more design-level tokens 110 or syntax-level tokens 112 may be identified from the user's speech, and such tokens may be mapped to design elements 118 or syntactic elements 120 included in the calibration sequence. The mapping information may be stored as token mapping data 116. Calibration is described further herein with reference to FIG. 9.

In some cases, the syntax-level token(s) 112 or the design-level token(s) 110 may be pronounced or described in different ways in the audio input 106, and the token mapping data 116 may determine a syntactic element 120 or a design element 118 that corresponds to each pronunciation. For example, the syntax-level tokens 112 "open bracket", "open curly bracket", or "open brace" may each be mapped to a syntactic element 120 that is the "{" character.

In some cases, the design-level tokens 110 and corresponding design elements 118 may be considered higher-level information that indicates structure, control flow, system elements, or architecture for the computer program being described. The syntax-level tokens 112 and corresponding syntactic elements 120 may be considered lower-level information that indicates particular implementation details for the higher-level elements. For example, a design element 118 may indicate a class to be included in the computer program, and one or more syntactic elements 120 may describe the source code to implement members of the class.

In some implementations, the audio input 106 may include one or more audio commands, by which the user 104 may specify whether design-level (e.g., higher-level) information or syntax-level (e.g., lower-level) information is being provided in the audio input 106. For example, the user 104 may say "begin design mode" to instruct the system to interpret subsequent audio input 106 as design-level information, and the user 104 may say "begin code mode" to instruct the system to interpret subsequent audio input 106 as syntax-level information. Examples of design-level information and syntax-level information are further described with reference to FIGS. 3 and 4 respectively.

The determined design element(s) 118 and syntactic element(s) 120 may be provided to a development environment module 122. In some implementations, the development environment module 122 may include an integrated development environment (IDE), such as Eclipse™, provided by the Eclipse Foundation, Visual Studio®, provided by Microsoft Corporation of Redmond, Wash., or another IDE. The development environment module 122 may assemble the design element(s) 118 and the syntactic element(s) 120, to generate at least a portion of a structured language sequence such as a computer program 124.

The development environment module 122 may visually display source code for the computer program 124. The development environment module 122 may include functionality for compiling and linking the source code to generate executable code, in cases where the computer program 124 is generated in a compiled programming language. The development environment module 122 may also include a runtime component, virtual machine, interpreter, or other software to enable execution of the computer program 124, in cases where the computer program 124 is generated in an interpreted programming language. The development environment module 122 may also include functionality to enable the computer program 124 to be executed, debugged, or otherwise analyzed by the user 104.

In some implementations, at least a portion of the generated computer program 124 may be provided to an output generation module 126, and presented as audio output 128 describing at least a portion of the computer program 124. In such cases, the output generation module 126 may include text-to-speech conversion software to generate the audio output 128 based on the computer program 124. Implementations may also present at least a portion of the computer program 124 as visual output 130, such as in a display window of the development environment module 122 or in a text editor. The audio output 128 may supplement the visual output 130, or at least pertly replace the visual output 130. The visual output 130 may include text output. The visual output 130 may also include non-textual output, such as colors, shapes, designs, and so forth.

Although the examples herein describe output that is either audio or visual output, implementations are not limited to these types of output. Implementations may also support output as haptic information, such as through a vibration, force, or other motion of the user device 102 generated by one or more haptic actuators. Implementations may also support chemical-based outputs. For example, implementations may support olfactory (e.g., smell-based) and gustatory (e.g., taste-based) outputs, in the form of chemicals that may be recognized as smells or tastes by the user 104.

In a conventional IDE, a user may be working on different portions of a software system in different views or windows of the IDE. For example, a user may open one window of the IDE to display source code for the view portion of a software system, and the user may open another window of the IDE to display source code for the controller portion of a software system. In this example, the development context (e.g., view vs. controller) for these various program sections is visually distinguishable through use of the different windows, frames, or other user interface elements of the IDE.

In some implementations, the audio output 128 may include one or more context indicators, indicating a development context for the computer program 124 as it is being presented in the audio output 128. Such context indicators may include different musical cues, tones, pitches, songs, rhythms, musical genres, or particular pieces of music, that are played in the background to indicate different development contexts while the computer program 124 is being audibly presented. The context indicators may also include different voices, accents, voice pitches, or other differences in the voices used to audibly present different portions of the computer program 124. Audio presentation of the computer program 124, including the audible context indicators, is described further with reference to FIG. 5.

In some implementations, the development environment module 122 may also provide feedback information 132, which is translated by the output generation module 126 and included in one or both of the audio output 128 and the visual output 130. The feedback information 132 may include questions that the development environment module 122 asks of the user 104 to resolve inconsistencies or incompleteness in the audio input 106. For example, a user 104 may indicate that source code for the computer program 124 is to include an implementation of method A that is a member of Class X. In cases where Class X does not include a method A, the development environment module 122 may generate feedback information 132 asking the user 104 whether method A is to be added as a member of Class X, asking whether the user 104 intended to specify a different method, and so forth.

The feedback information 132 may also include auto-complete information, describing a list of available members of a class, a list of available input parameters to a method, or other auto-complete information that may otherwise be provided visually through an IDE. In some implementations, the feedback information 132 may include errors, alerts, or other information generated during compiling, linking, interpreting, executing, or debugging the computer program 124. Any or all of these types of the feedback information 132 may be presented as part of the audio output 128 or the visual output 130. Operations of the development environment module 122 are described further with reference to FIG. 8.

Although the examples herein describe operations performed by the user device(s) 102, implementations are not so limited. In some cases, the one or more operations described as being performed by the user device(s) 102 may be performed on a plurality of various computing devices including server devices or cloud computing devices.

In some cases, software developers may prefer audio dictation of source code instead of employing traditional methods of writing source code by typing into an IDE. However, existing speech recognition technologies may be inadequate for interpreting spoken input in a programming language. Implementations described herein provide techniques for a conversation-based software development platform, in which the audio input 106 and the audio output 128 supplement or replace conventional interactions (e.g., typing input and visual output) between a developer and an IDE. Because implementations provide for the generation of the computer program 124 based on the audio input 106, and the audible presentation of the computer program 124 through the audio output 128, implementations may enable software developers or other users 104 to work remotely from their usual workstations in environments that may not normally be conducive to writing software. For example, a user 104 may code while sitting on a beach, driving in a car, programming a controller associated with industrial machinery, or in other settings.

Implementations may also enable software to be written by beginning programmers (e.g., students or children), hobbyists, or others who may desire to create software but who may lack knowledge of a programming language. In such cases, the user's description of their program in the audio input 106 may be translated by the user device 102 into the design element(s) 118 and the syntactic element(s) 120 to generate the computer program 124.

Moreover, by providing an audio interface for software development, implementations may enable software developers of varying capabilities to write code more efficiently. For example, implementations may be employed by software developers who may be visually impaired or who may be unable to use a keyboard or mouse to enter information into a conventional IDE. Implementations may also provide a means for developing software on headless devices, embedded systems, or on small devices that may otherwise be difficult to interact with through conventional input or output mechanisms.

Figure 2:
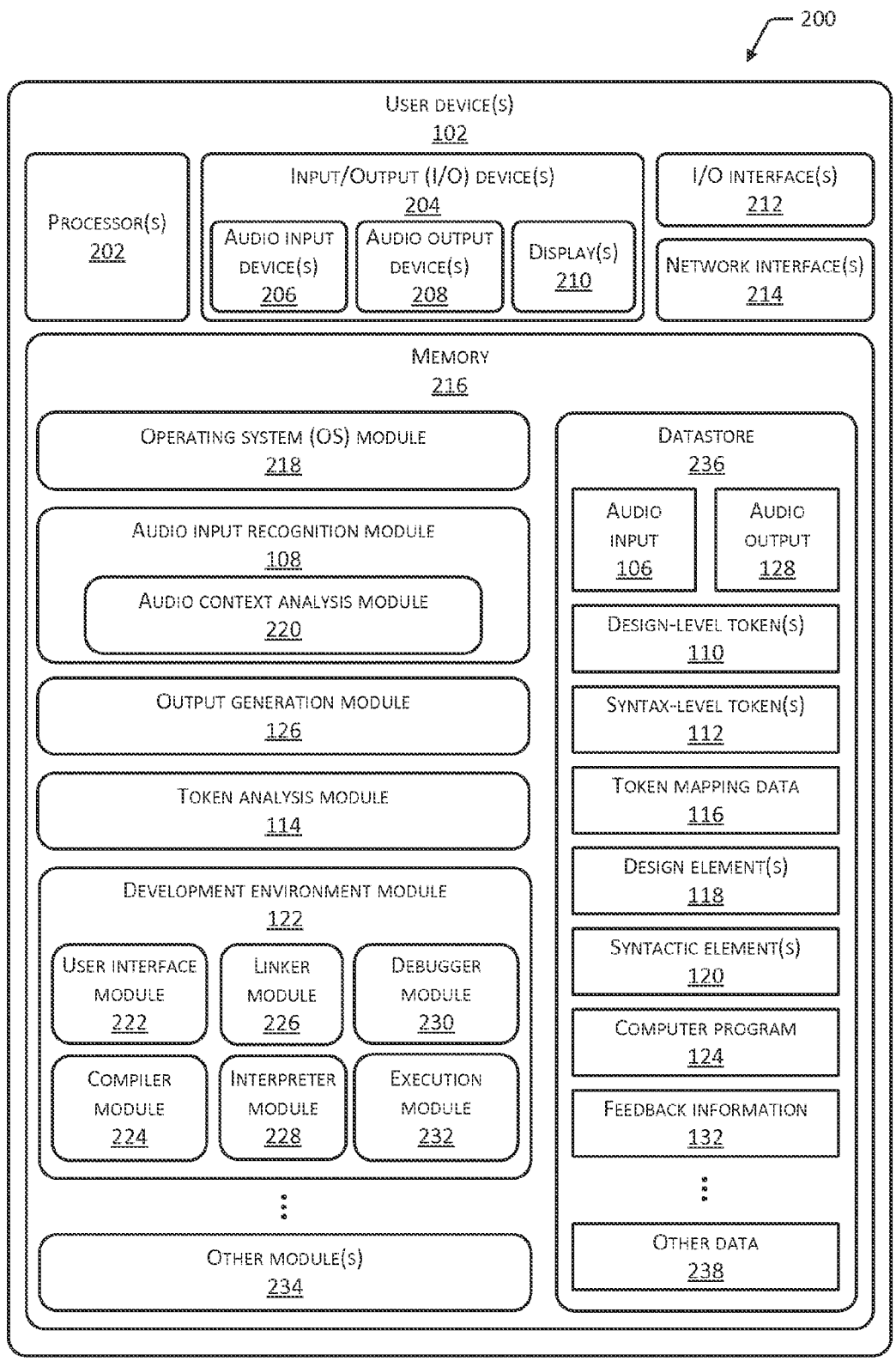
FIG. 2 depicts a block diagram of a user device configured to perform operations for receiving and analyzing the audio input, and generating a sequence in a structured language based on the audio input.

FIG. 2 depicts a block diagram 200 of the user device(s) 102 configured to perform operations for receiving and analyzing the audio input 106, and generating a sequence in a structured language (e.g., the computer program 124) based on the audio input 106. As shown in block diagram 200, the user device(s) 102 may include one or more processors 202 configured to execute one or more stored instructions. The processor(s) 202 may comprise one or more cores.

The user device(s) 102 may include one or more input/output (I/O) devices 204, such as one or more audio input devices 206 (e.g., a microphone) to receive speech or other audio input 106. The I/O device(s) 204 may also include other types of input devices such as a keyboard, a mouse, a pen, a game controller, a touch input device, a gestural input device, a haptic input device, or other devices. In some cases, the I/O device(s) 204 may include one or more audio output devices 208 (e.g., speakers) to present the audio output 128 to the user 104. The I/O device(s) 204 may also include one or more displays 210 to present visual information to the user 104, or other types of output devices such as a printer, haptic output devices, and so forth. The I/O device(s) 204 may be physically incorporated with the user device(s) 102, or may be externally placed.

The user device(s) 102 may include one or more I/O interfaces 212 to enable components or modules of the user device(s) 102 to control, interface with, or otherwise communicate with the I/O device(s) 204. The I/O interface(s) 212 may enable information to be transferred in or out of the user device(s) 102, or between components of the user device(s) 102, through serial communication, parallel communication, or other types of communication. For example, the I/O interface(s) 212 may comply with the RS-232 standard for serial ports, or with the Institute of Electrical and Electronics Engineers (IEEE) 1284 standard for parallel ports. As another example, the I/O interface(s) 212 may be configured to provide a Universal Serial Bus (USB) connection. The user device(s) 102 may also include one or more busses or other internal communications hardware or software that allow for the transfer of data between the various modules and components of the user device(s) 102.

The user device(s) 102 may include one or more network interfaces 214 to enable communications between the user device(s) 102 and other networked devices. The network interface(s) 214 may include one or more network interface controllers (NICs) or other types of transceiver devices configured to send and receive communications over a network.

The user device(s) 102 may include one or more memories, described herein as memory 216. The memory 216 comprises one or more computer-readable storage media (CRSM). The CRSM may be include one or more of an electronic storage medium, a magnetic storage medium, an optical storage medium, a quantum storage medium, a mechanical computer storage medium, and so forth. The memory 216 provides storage of computer-readable instructions, data structures, program modules, and other data for the operation of the user device(s) 102.

The memory 216 may include an operating system (OS) module 218. The OS module 218 is configured to manage hardware resources such as the I/O device(s) 204, the I/O interface(s) 212, and the network interface(s) 214, and to provide various services to applications, processes, or modules executing on the processor(s) 202. The OS module 218 may include one or more of the following: any version of the Linux® operating system originally released by Linus Torvalds; any version of iOS™ from Apple Inc. of Cupertino, Calif.; any version of Windows® or Windows Mobile® from Microsoft Corporation of Redmond, Wash.; any version of Android® from Google, Inc. of Mountain View, Calif. and its derivatives from various sources; any version of Palm OS® from Palm, Inc. of Sunnyvale, Calif. and its derivatives from various sources; any version of BlackBerry OS® from Blackberry Limited of Waterloo, Ontario, Canada; any version of VxWorks® from Wind River Systems, Inc. of Alameda, Calif.; or other operating systems.

In some implementations, the memory 216 includes the audio input recognition module 108, the output generation module 126, and the token analysis module 114. The audio input recognition module 108 may perform operations to recognize one or more design-level tokens 110, one or more syntax-level tokens 112, or both design-level tokens 110 and syntax-level tokens 112. The audio input recognition module 108 may include an audio context analysis module 220 to recognize and analyze one or more context characteristics included in the audio input 106. Such context characteristics may include, but are not limited to, the user's tone or pitch of speech included in the audio input 106, the speed of the user's speech, inflections in the user's speech, pauses in the audio input 106, or one or more sounds other than speech included in the audio input 106 such as non-lexical vocables. In some implementations, such context characteristics may convey information regarding the computer program 124 or other structured language sequence to be generated.

The memory 216 may also include the development environment module 122. In some cases, the development environment module 122 may include a user interface module 222 to present a user interface for the user 104 to interact with the development environment module 122. The user interface module 222 may visually present at least a portion of the computer program 124, or the feedback information 132, to the user 104. The development environment module 122 may also include a compiler module 224, a linker module 226, an interpreter module 228, a debugger module 230, and an execution module 232, respectively configured to perform compiling, linking, interpreting, debugging, and execution operations on at least a portion of the computer program 124.

Operations of the audio input recognition module 108, the output generation module 126, the token analysis module 114, and the development environment module 122 are described further herein with reference to FIGS. 3-9. The memory 216 may also include one or more other modules 234, such as a user authentication module, an access control module, a security or cryptography module, and so forth.

The memory 216 may include a datastore 236 to store information for operations of the user device(s) 102. The datastore 236 may comprise a database, array, structured list, tree, or other data structure, and may be a relational or a non-relational datastore. The datastore 236 may store one or both of the audio input 106 and the audio output 128. The datastore 236 may store the design-level token(s) 110 and the syntax-level token(s) 112 extracted from the audio input 106 by the audio input recognition module 108. The datastore 236 may store the design element(s) 118 and the syntactic element(s) 120 that are determined based on applying the token mapping data 116 to the design-level token(s) 110 and the syntax-level token(s) 112 respectively. The datastore 236 may also store the token mapping data 116. The datastore 236 may store the computer program 124, and the feedback information 132.

In some cases, the datastore 236 may also store other data 238, such as user account information, user authentication information, and so forth. In some implementations, at least a portion of the information stored in the datastore 236 may be stored externally to the user device(s) 102, on other devices that are accessible to the user device(s) 102 via the I/O interface(s) 212 or via the network interface(s) 214.

Figure 3:
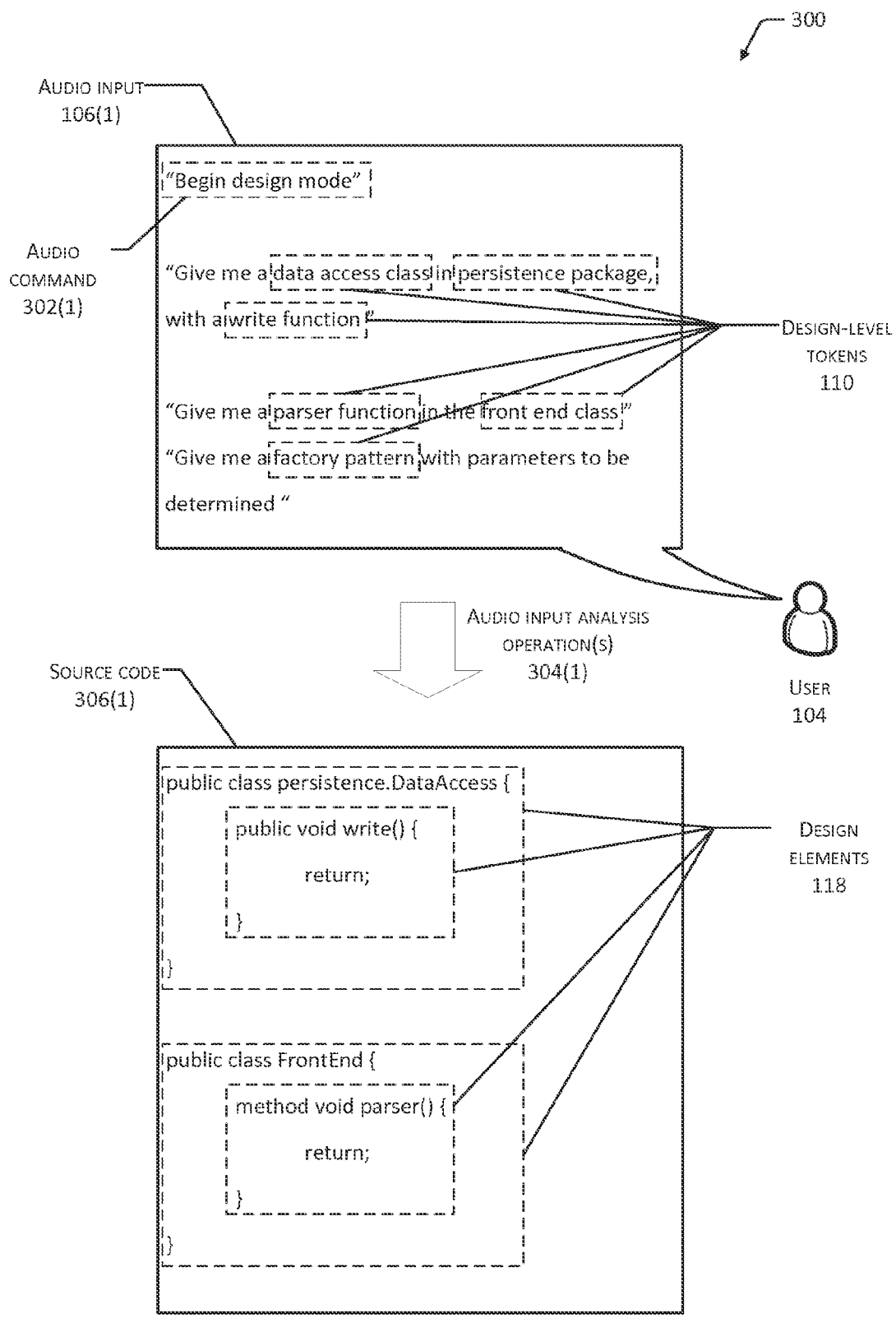
FIG. 3 depicts a schematic of audio input including one or more design-level tokens, used to generate source code including one or more design elements corresponding to the design-level token(s).

FIG. 3 depicts a schematic 300 of the audio input 106 including one or more design-level tokens 110. In this example, the audio input 106 is analyzed to generate source code for the computer program 124, including one or more design elements 118 corresponding to the design-level token(s) 110.

In the example shown, the audio input 106(1) is spoken by the user 104 and includes an audio command 302(1) "begin design mode." In some implementations, the audio input recognition module 108, the token analysis module 114, or other modules of the user device 102 may recognize one or more audio commands 302. The particular audio command 302(1) "begin design mode" may be recognized and interpreted to place the system into a design mode, such that the subsequent audio input 106(1) is interpreted as design-level information to be incorporated into the computer program 124.

Following the audio command 302(1), the user 104 may utter additional audio input 106(1), including a phrase "give me a data access class in persistence package, with a write function." The audio input recognition module 108 may identify one or more design-level tokens 110 included in this phrase, such as "data access class," "persistence package," and "write function." In some implementations, recognition of the design-level tokens 110 may be based on recognizing particular keywords that indicate design-level constructs in the target programming language, such as "class," "package," or "function," and identifying nearby words in the phrase that are related based on context, based on the user's speech patterns, pauses in the speech, semantic information for the design-level tokens, or other characteristics.

In some implementations, the audio input recognition module 108 may also analyze the audio input 106 to determination information that specifies an arrangement, an ordering, or some other type of relationship between the various design-level tokens 110. For example, in the example audio input 106(1), the user 104 has requested a "data access class in persistence package," indicating that the "data access" class is to be included "in" the particular package (e.g., where "package" is used in the Java language context as a collection of classes). The user 104 has also requested "with a write function." In this case, the audio input recognition module 108 may recognize that, in this context, a function may be a member of a class and not a member of a package. Thus, the phrase "with a write function" may be interpreted as requesting an arrangement of design-level tokens 110 such that the "write" function is a member of the "data access" class.

The various design-level tokens 110 extracted from the audio input 106(1) may be provided to the token analysis module 114, which may perform one or more audio input analysis operations 304(1) to determine a design element 118 that corresponds to each of the design-level tokens 110. In some cases, this analysis may be based on token mapping data 116 which maps each of a plurality of design-level tokens to a design element 118. In some implementations, this mapping may be a many-to-one mapping such that multiple design-level tokens 110 may be mapped to a single design element 118. For example, because multiple terms (e.g., "function," "method," "accessor," and so forth) may be employed by various users to refer to a particular design element (e.g., a method) in the target programming language, the token mapping data 116 may map each of those multiple tokens to a same design element 118.

The various design elements 118 identified may be provided to the development environment module 122, which may assemble the design elements 118 into source code 306 for the computer program 124. FIG. 3 depicts example source code 306(1) that may be generated based on the design elements 118 corresponding to the design-level tokens 110 identified in the audio input 106(1), in this example, two classes have been generated. A "DataAccess" class has been generated in the "persistence" package, including a "write" function as requested. Also, a "FrontEnd" class has been generated, including a "parser" function as requested. These classes, or other design elements 118, may be automatically generated as a shell or in an incomplete form, with particular implementation details to be specified later by the user 104 providing the audio input 106 in a syntax mode, as described with reference to FIG. 4.

Some implementations enable the user 104 to specify a template of a design element 118, the template including one or more implementation details to be completed later. For example, the audio input 106(1) in FIG. 3 includes a statement "Give me a factory pattern with parameters to be determined." The term "factory pattern" may be recognized as a design-level token 110, corresponding to a design element 118 for a factory design pattern in the source code 306. The phrase "parameters to be determined" may indicate that the factory pattern is to be added to the source code 306 as a template, leaving certain elements such as input parameters to be specified subsequently. In this way, implementations may enable higher-level elements such as design elements 118 to be specified first, and lower-level elements such as syntactic elements 120 to be subsequently specified by the user 104.

Figure 4:
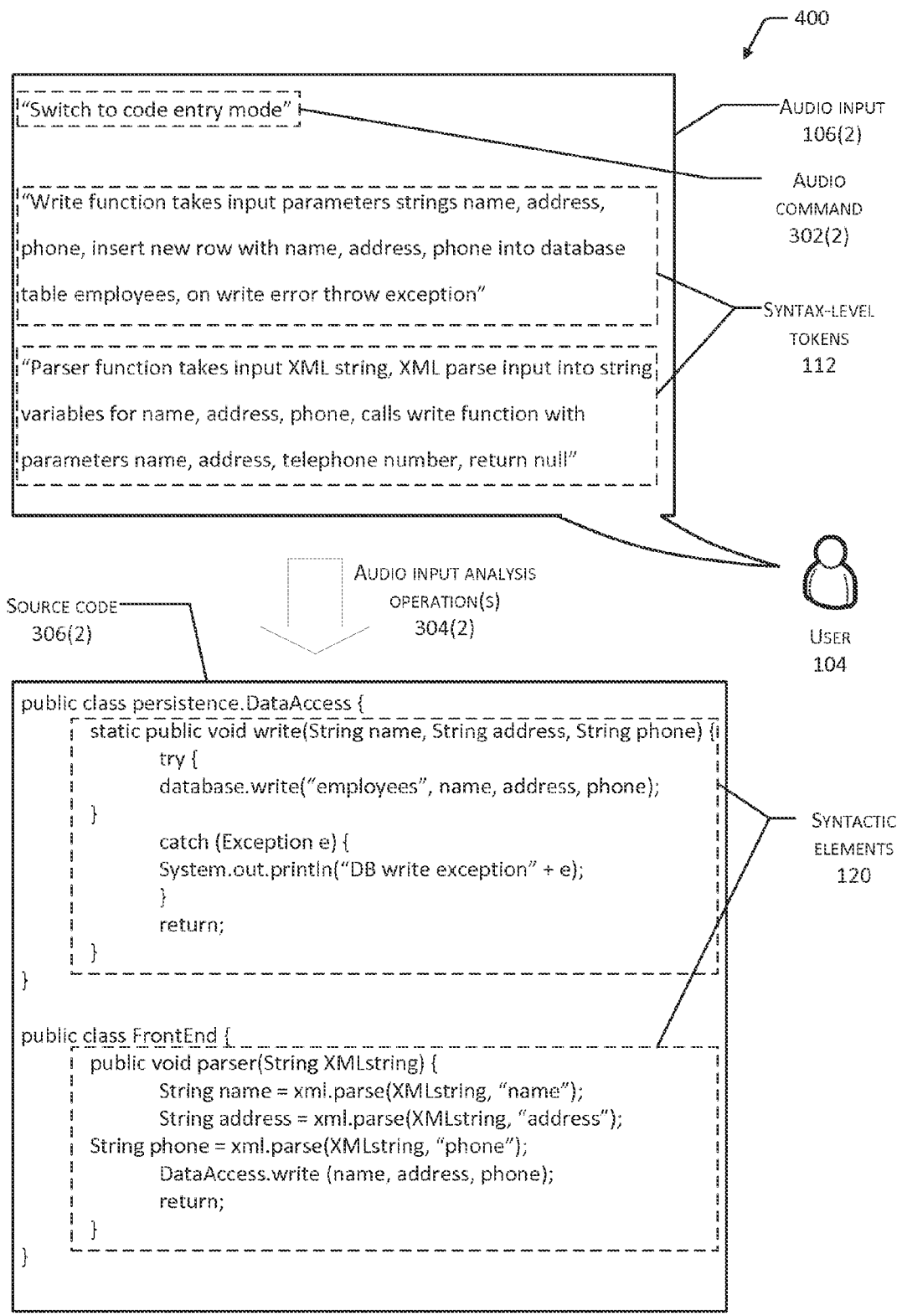
FIG. 4 depicts a schematic of audio input including one or more syntax-level tokens, used to generate source code including one or more syntactic elements corresponding to the syntax-level token(s).

FIG. 4 depicts a schematic 400 of the audio input 106 including one or more syntax-level tokens 112. In this example, the audio input 106 is analyzed to generate source code for the computer program 124, including one or more syntactic elements 120 corresponding to the syntax-level token(s) 112.

In the example shown, the audio input 106(2) is spoken by the user 104 and includes an audio command 302(2) "switch to code entry mode." As described above, the audio input recognition module 108, the token analysis module 114, or other modules of the user device 102 may recognize this command as placing the system into a syntax or code entry mode, such that subsequent audio input 106(2) is interpreted as syntax-level information to be incorporated into the computer program 124.

Following the audio command 302(2), the user 104 may utter additional audio input 106(2) which provides implementation details for one or more of the design elements 118. In this example, the user 104 utters "write function takes input parameters" and specifies one or more input parameters, including variable type, for the "write" method previously specified as a design element. Such utterances may be extracted from the audio input 106(2) as one or more syntax-level tokens 112. As with the design-level information, the audio input recognition module 108 may analyze the audio input 106 to determine information that specifies an arrangement, an ordering, or another type of relationship between the various syntax-level tokens 112. For example, in the example audio input 106(2), the order in which the user 104 utters the syntax-level tokens 112 may be interpreted as an order for the source code 306 to be generated. In this way, implementations may at least partly transcribe the syntax-level tokens 112 to generate the source code 306.

The various syntax-level tokens 112 extracted from the audio input 106(2) may be provided to the token analysis module 114, which may perform one or more audio input analysis operations 304(2) to determine a syntactic element 120 that corresponds to each of the syntax-level tokens 112. As with the design-level information, this analysis may be based on token mapping data 116 which maps each of a plurality of syntax-level tokens to a syntactic element 120. In some implementations, this mapping may be a many-to-one mapping, or a one-to-one-mapping.

The identified syntactic elements 120 may be provided to the development environment module 122, which may assemble the syntactic elements 120 and the design elements 118 into the source code 306 for the computer program 124. FIG. 4 depicts example source code 306(2) that may be generated based on the syntactic elements 120. In this example, the two classes previously generated during the design mode have been at least partly implemented with the source code 306(2) generated based on the syntactic elements 120.

In some implementations, at least a portion of the audio input 106 may be incorporated, in its originally received form, as comments inserted into the generated source code 306. Such commenting may help other users reading the source code 306 understand the intentions of the user 104 who dictated the audio input 106. The comments may also enable the original audio input 106 to be re-analyzed to generate another version of the computer program 124 in a different target programming language. Alternatively, in some cases a transcript of the audio input 106 may be stored in a separate file from the source code 306. Such a transcript may be displayed alongside the source code 306 in the user interface module 222 or elsewhere. The display may enable the user 104 who provided the audio input 106, or another user, to compare the audio input 106 to the source code 306 that is generated based on the audio input 106.

Moreover, some implementations may enable the user 104 to insert notes, comments, or other information that is included in the source code 306, or that is incorporated into a separate notes file, task list file, to-do list file, and the like. For example, the user 104 may state "add note fix this," while specifying a method or another code element in the audio input 106, and a note reading "fix this" may consequently be added to the source code 306 at that method. Such notes may be viewed by the user 104 (e.g., a developer), a reviewer of the code, a manager, test engineers, or other users.

In some implementations, one or more context characteristics may be recognized in the audio input 106 and analyzed. Such context characteristics may include one or more tones, pitches, inflections, speeds, or pauses in the speech included in the audio input 106. Context characteristics may convey information regarding the source code 306 or some other structured language sequence to be generated. For example, a pause in the audio input 106 may indicate an end of a statement, end of a method declaration or implementation, end of a class declaration or implementation, and so forth. Pauses may also indicate separations between blocks of code, and the length of various pauses may indicate block separation or other information regarding the source code 306 to be generated.

Figure 5:
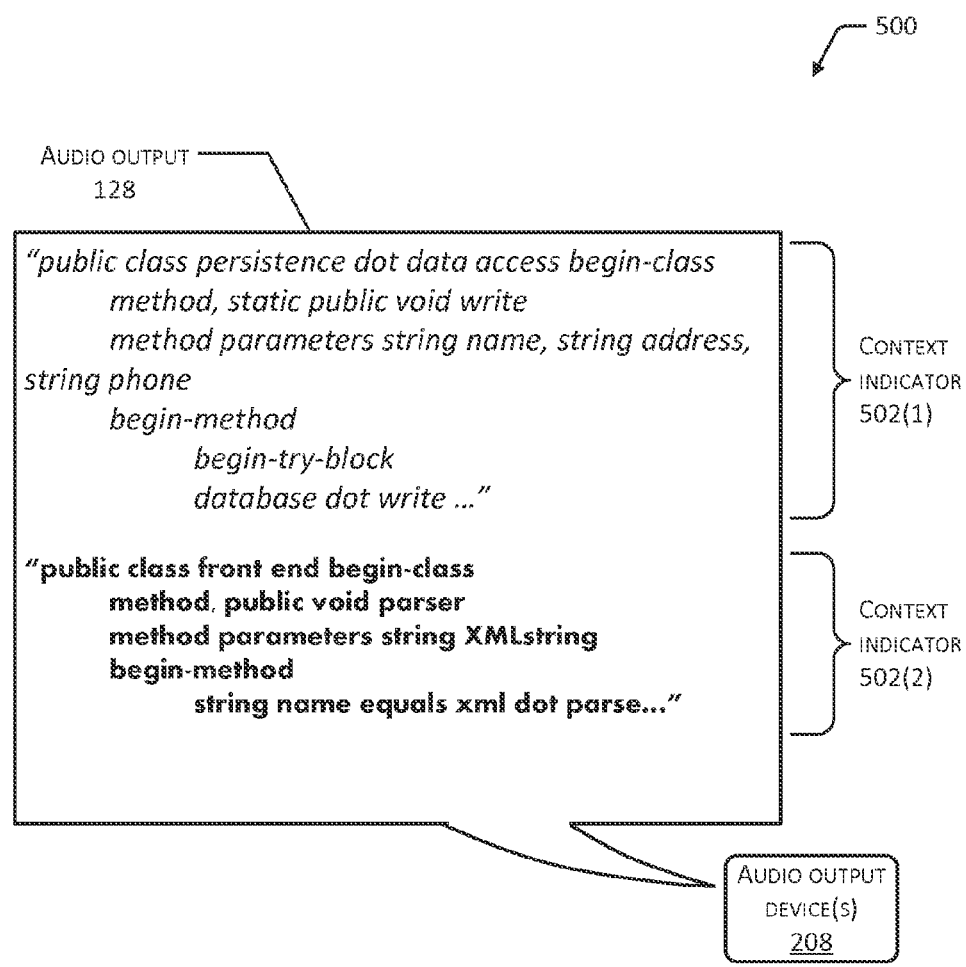
FIG. 5 depicts a schematic of audio output including an audio presentation of one or more portions of a computer program, including one or more context indicators to indicate a development context for the presented portions of the computer program.

FIG. 5 depicts a schematic 500 of the audio output 128 including an audio presentation of at least a portion of the source code 306 for the computer program 124. This presentation may include a recitation of at least a portion of the source code 306 by one or more audio output devices 208 (e.g., speakers) of the user device 102. In addition or instead of a recitation, the audible presentation of the source code 306 may include other types of presentation, such as presenting the source code 306 audibly as tonal patterns (e.g., music) or rhythmic patterns.

In some implementations, the audio output 128 includes one or more context indicators 502, audibly indicating a development context for the source code 306 currently being presented. In the example of FIG. 5, two portions of the source code 306 are being audibly presented: the source code for the "DataAccess" class and the source code for the "FrontEnd" class, as generated in the examples of FIGS. 3 and 4. Two different context indicators 502(1) and 502(2) are being presented to enable the user 104 to distinguish different development contexts for the two source code portions. In some implementations, the context indicator 502 may be presented concurrently with the source code portion it is contextualizing. Alternatively, the context indicator 502 may be presented before or after the presentation of the source code portion. In the example of FIG. 5, the two different source code portions are depicted in different fonts to illustrate their different contexts.

Implementations support various types of the audible context indicators 502. For example, the context indicator(s) 502 may include one or more tones, where one or more particular frequencies of the tone(s) may identify a development context. The context indicator(s) 502 may also include a sequence or pattern of tones, where the particular sequence or pattern may identify the development context. For example, a software development project may include a first development context for front end code, to be distinguished from a second development context for middleware. In such cases, one or more tones at the frequency of middle-C may indicate that the presented code is for the front end, whereas one or more tones at an octave above middle-C may indicate that the presented code is for middleware.

In some cases, a particular piece of music, or music from a particular genre of music, composer, or performing artist may be employed as the context indicator 502. For example, a software development project may include a first development context for a view of the system, and a second development context for a controller in the system. In such cases, jazz music may indicate the view, whereas classical music may indicate the controller. Alternatively, a piece by John Coltrane may indicate the view, whereas a piece by Thelonius Monk may indicate the controller. Alternatively, a particular piece "A Love Supreme" by John Coltrane may indicate the view, whereas a particular piece "Round Midnight" by Thelonius Monk may indicate the controller. In this way, different pieces of music, or music of different musical genres, artists, or composers may distinguish different development contexts in the audio output 128. In such cases, the music for the context indicator(s) 502 may be played in the background (e.g., as a soundtrack), while the source code 306 is being audibly presented in the audio output 128. Alternatively, the musical context indicators 502 may be played before or after the audio output 128. Moreover, in some implementations a particular sound file may be played at different pitches or speeds to indicate different development contexts.

In some implementations, differently pitched voices may be employed as the context indicators 502. For example, source code 306 recited in a higher-pitched voice may indicate that the source code 306 is front end code, whereas source code 306 recited in a lower-pitched voice may indicate that the source code 306 is back end code. Moreover, in some implementations differently accented voices may be employed as context indicators 502. For example, source code 306 recited in an Australian accent may indicate that the source code 306 is front end code, whereas source code 306 recited in a Scottish accent may indicate that the source code 306 is back end code. Further, in some implementations different gendered voices may be employed as context indicators 502. For example, source code 306 recited by a male voice may indicate front end code, whereas source code recited by a female voice may indicate back end code.

Although the examples above describe distinctions between two different development contexts, implementations support any number of context indicators 502 to distinguish between any number of development contexts. In some cases, the context indicators 502 may be configurable by the user 104, based on user preferences.

Figure 6:
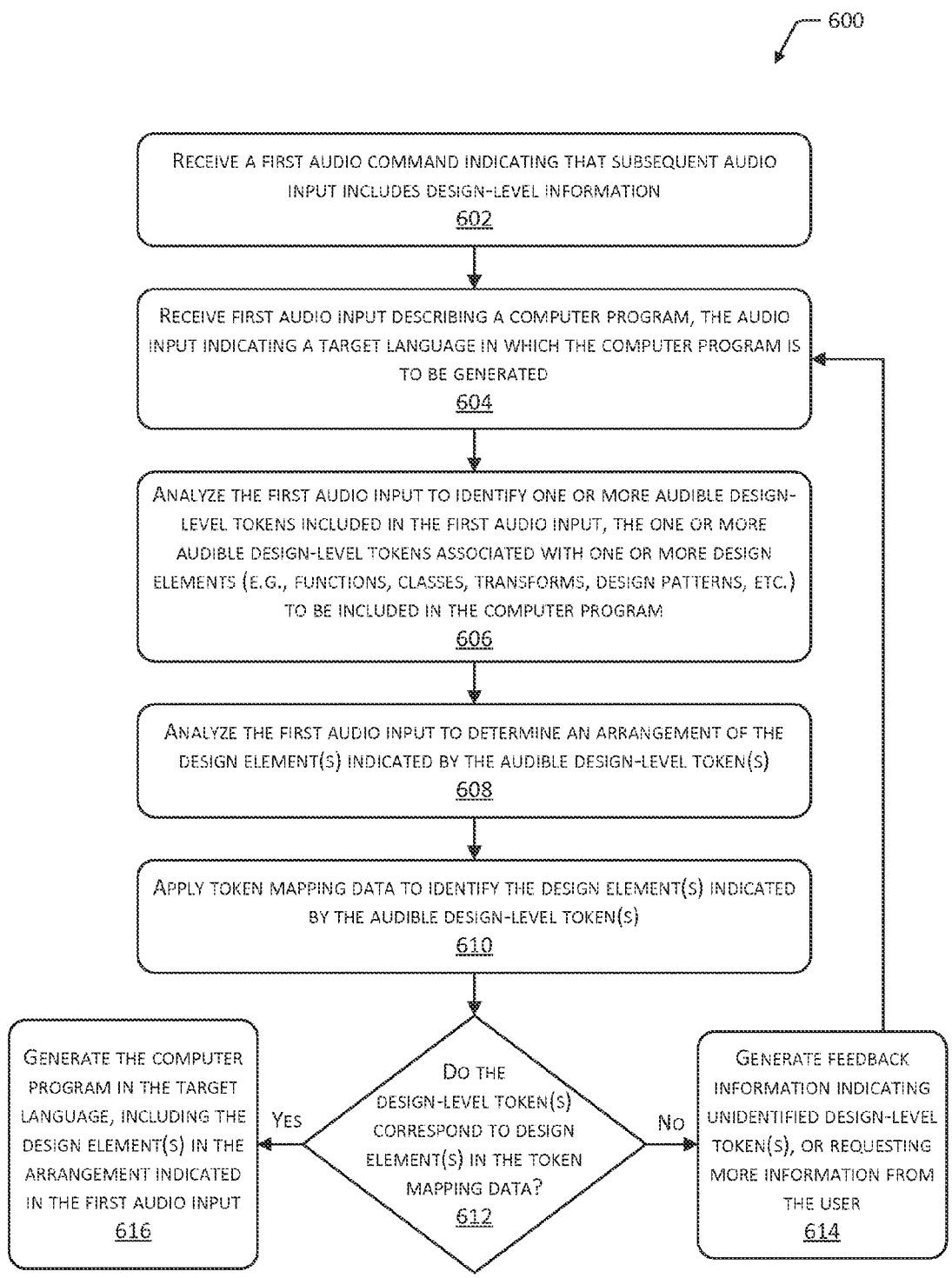
FIG. 6 depicts a flow diagram of a process for analyzing audio input to identify one or more design-level tokens, and generating a computer program including one or more design elements corresponding to the design-level token(s).

FIG. 6 depicts a flow diagram 600 of a process for analyzing the audio input 106 to identify one or more design-level tokens 110, and generating the source code 306 for the computer program 124 to include one or more design elements 118 corresponding to the design-level token(s) 110. Operations included in the process may be performed by the audio input recognition module 108, the token analysis module 114, the development environment module 122, the output generation module 126, or by other modules of the user device 102.

At 602, a first audio command 302 may be received, indicating that the subsequent audio input 106 includes design-level information (e.g., specifying design elements 118). In some implementations, such a command may be uttered by the user 104 to indicate that the audio input recognition module 108 is to analyze the audio input 106 to identify design-level tokens 110 included in the audio input 106.

At 604, a first portion of the audio input 106 may be received describing the computer program 124, or describing another type of structured language sequence. In some implementations, the audio input 106 may also include an indication by the user 104 of a target language in which the computer program 124, or other type of sequence, is to be generated.

At 606, the first portion of the audio input 106 may be analyzed to identify one or more audible design-level tokens 110 included in the audio input 106. As described above, the design-level token(s) 110 may be associated with one or more design elements 118 to be included in the computer program 124, or other type of structured language sequence.

At 608, the audio input 106 may be further analyzed to determine an arrangement, an ordering, a hierarchy, or some other type of relationship between the various design elements 118 indicated by the design-level tokens 110, as described above with reference to FIG. 3.

At 610, the token mapping data 116 may be applied to identify the design element(s) 118 indicated by the audible design-level token(s) 110 in the audio input 106.

At 612, a determination may be made whether the design-level token(s) 110 correspond to design element(s) 118 described in the token mapping data 116. If not, then at 614 feedback information 132 may be generated, including information indicating the presence of at least one unidentified design-level token 110 in the audio input 106. Such feedback information 132 may be audibly presented in the audio output 128. The feedback information 132 may also be visually presented through the user interface module 222 of the development environment module 122. Such feedback may prompt the user 104 to correct or resolve the unidentified design-level token 110.

In some cases, the operation at 614 may generate feedback information 132 that requests additional information from the user 104. For example, the user 104 may specify "give me a factory pattern" in the audio input 106. The "factory pattern" design element 118 may be recognized based on the "factory pattern" token, but more information may be requested from the user 104 to complete the implementation of the factory pattern. The information may include a name of the design element 118, a number, name, and data type of input or output parameters, or other details. In such cases, the process may return to 604 to receive additional audio input 106 from the user 104. In this way, implementations may provide for an interaction between the user 104 and the development environment that may be considered analogous to a conversation, in which the user 104 specifies a design element 118 (or a syntactic element 120), and the modules of the user device 102 prompt the user 104 to clarify ambiguous tokens, explain unrecognized tokens, or otherwise resolve incomplete or inconsistent requests for elements to be included in the computer program.

If the determination at 612 is positive, at 616 the source code 306 for the computer program 124 may be generated to include the design elements 118. In some cases, the design elements 118 may be incorporated into the source code 306 based on the arrangement determined at 608.

Figure 7:
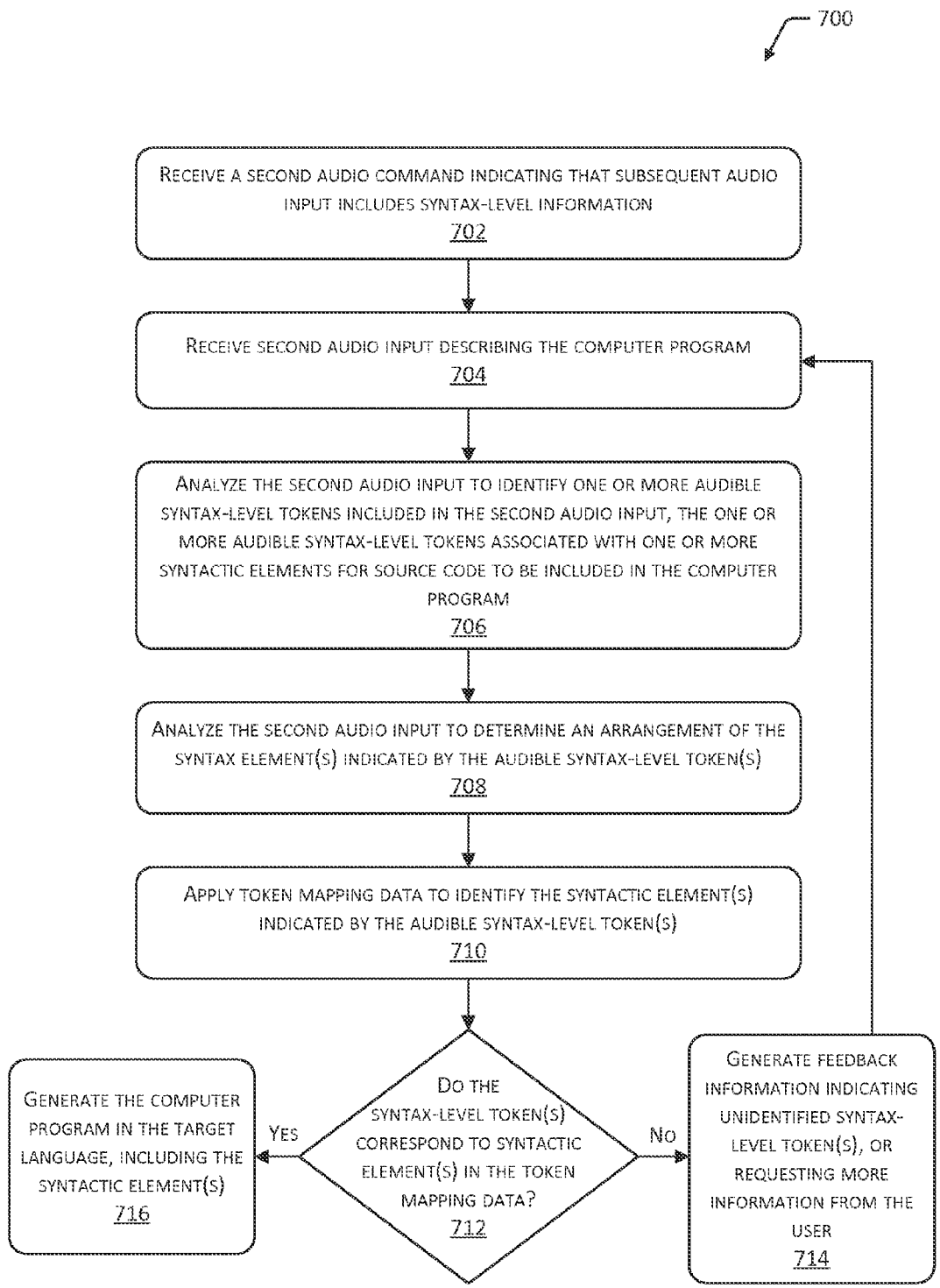
FIG. 7 depicts a flow diagram of a process for analyzing audio input to identify one or more syntax-level tokens, and generating a computer program including one or more syntactic elements corresponding to the syntax-level token(s).

FIG. 7 depicts a flow diagram 700 of a process for analyzing the audio input 106 to identify one or more syntax-level tokens 112, and generating the source code 306 for the computer program 124 to include one or more syntactic elements 120 corresponding to the syntax-level token(s) 112. Operations included in the process may be performed by the audio input recognition module 108, the token analysis module 114, the development environment module 122, the output generation module 126, or by other modules of the user device 102.

At 702, a second audio command 302 may be received, indicating that the subsequent audio input 106 includes syntax-level information (e.g., specifying syntactic elements 120). In some implementations, such a command may be uttered by the user 104 to indicate that the audio input recognition module 108 is to analyze the audio input 106 to identify syntax-level tokens 112 included in the audio input 106.

At 704, a second portion of the audio input 106 may be received describing the computer program 124, or describing another type of structured language sequence.

At 706, the second portion of the audio input 106 may be analyzed to identify one or more audible syntax-level tokens 112 included in the audio input 106. As described above, the syntax-level token(s) 112 may be associated with one or more syntactic elements 120 to be included in the computer program 124, or other type of structured language sequence.

At 708, the audio input 106 may be further analyzed to determine an arrangement, an ordering, a hierarchy, or some other type of relationship between the various syntactic elements 120 indicated by the syntax-level tokens 112, as described above with reference to FIG. 4.

At 710, the token mapping data 116 may be applied to identify the syntactic element(s) 120 indicated by the audible syntax-level token(s) 112 in the audio input 106.

At 712, a determination may be made whether the syntax-level token(s) 112 correspond to syntactic element(s) 120 described in the token mapping data 116. If not, then at 714 feedback information 132 may be generated, including information indicating the presence of at least one unidentified syntax-level token 112 in the audio input 106. As described above, such feedback information 132 may be audibly presented, visually presented, or both audibly and visually presented.

In some cases, the operation at 714 may generate feedback information 132 the requests additional information from the user 104 to clarify ambiguous tokens, explain unrecognized tokens, or otherwise resolve incomplete or inconsistent requests for elements to be included in the computer program, as described above with regard to 614. In such cases, the process may return to 704 to receive additional audio input 106 from the user 104.

If the determination at 712 is positive, at 716 the source code 306 for the computer program 124 may be generated to include the syntactic elements 120. In some cases, the syntactic elements 120 may be incorporated into the source code 306 based on the arrangement determined at 708.

Through the use of the audio command(s) 302, implementations enable the user 104 to toggle back and forth between specifying design-level information and syntax-level information, to audibly specify the source code 306 for the computer program 124. Accordingly, while the examples herein may describe the user 104 dictating design-level information and then dictating syntax-level information, implementations support audio input 106 that includes any number of dictated portions at either the design level or the syntax level.

Figure 8:
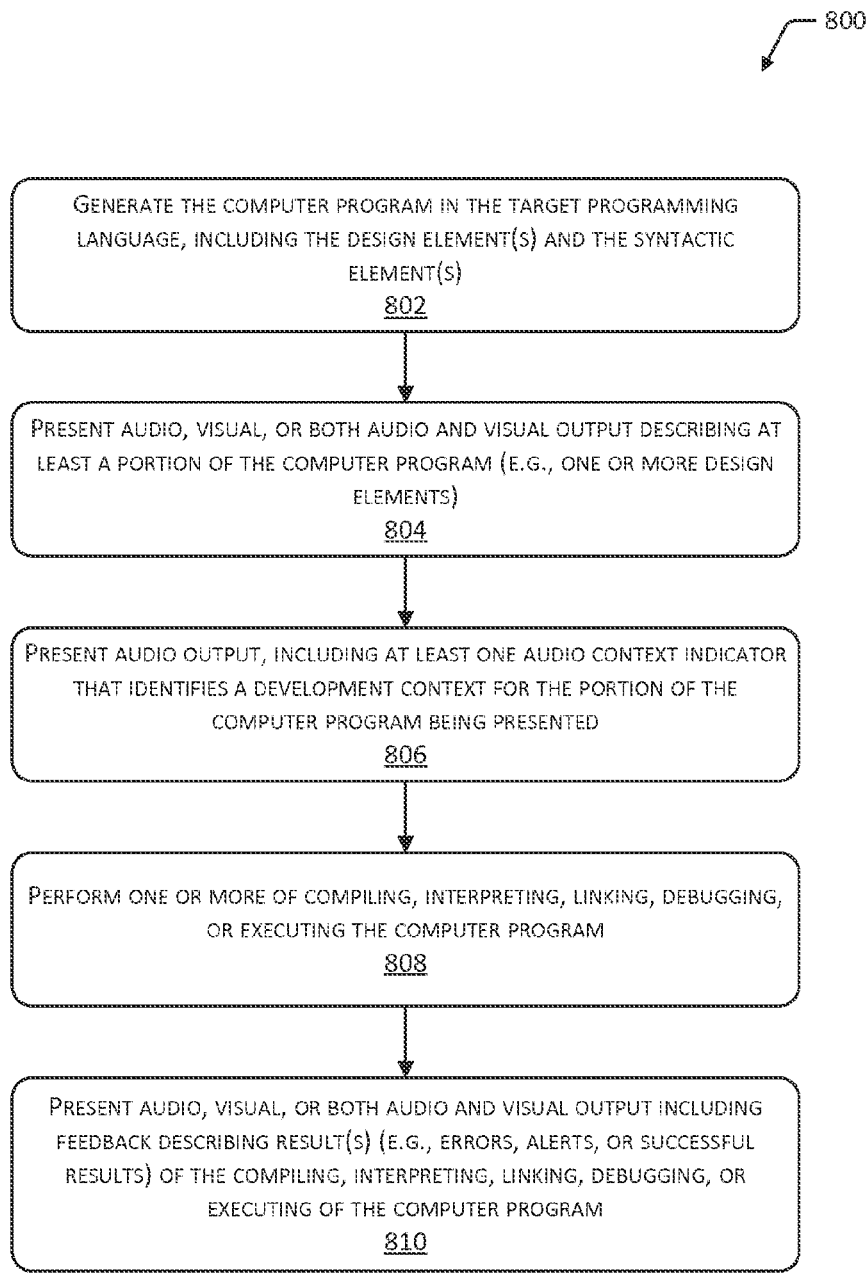
FIG. 8 depicts a flow diagram of a process for presenting at least a portion of the generated computer program, including a presentation of audio or visual output indicating a development context for the presented information.

FIG. 8 depicts a flow diagram 800 of a process for presenting at least a portion of the generated source code 306 for the computer program 124, including presenting one or more audible context indicators 502 that indicate a development context for the presented source code 306. Operations included in the process may be performed by the audio input recognition module 108, the token analysis module 114, the development environment module 122, the output generation module 126, or by other modules of the user device 102.

At 802, source code 306 for the computer program 124 is generated in the target programming language. As described above with reference to FIGS. 6 and 7, the source code 306 may be generated to include the design element(s) 118 and the syntactic element(s) 120 identified based on one or more tokens extracted from the audio input 106.

At 804, output may be presented that describes at least a portion of the source code 306 for the computer program 124. Such output may describe one or more design elements 118 of the computer program 124, one or more syntactic elements 120 of the computer program 124, or both design elements 118 and syntactic elements 120. In some implementations, the output may be included in the audio output 128. The output may also be presented visually, through the user interface module 220 of the development environment module 122, or through other means.

At 806, one or more context indicators 502 may be presented, indicating a development context associated with the portion of the source code 306 currently being presented. As described above with reference to FIG. 5, the context indicator(s) 502 may include audible context indicators presented as part of the audio output 128. In some cases, the context indicator(s) 502 may also be presented visually.

At 808, one or more actions may be performed on the source code 306. In cases where the target programming language is a compiled programming language, the actions may include compiling and linking the source code 306 to generate a machine-executable version (e.g., a binary version) of the computer program 124. The actions may also include executing the machine-executable version of the computer program 124. In cases where the target programming language is an interpreted programming language, the actions may include interpreting and executing the computer program 124 through a virtual machine, an interpreter, or other process. The actions may also include debugging the computer program 124, or other actions.

At 810, additional output may be presented to provide feedback information 132, describing a result of the actions performed at 808. Such feedback information 132 may be presented audibly, as part of the audio output 128, visually through the user interface module 220 as the visual output 130, or both audibly and visually. For example, errors or alerts resulting from an attempted compiling, linking, debugging, interpreting, or executing of the computer program 124 may be described in the feedback information 132.

Figure 9:
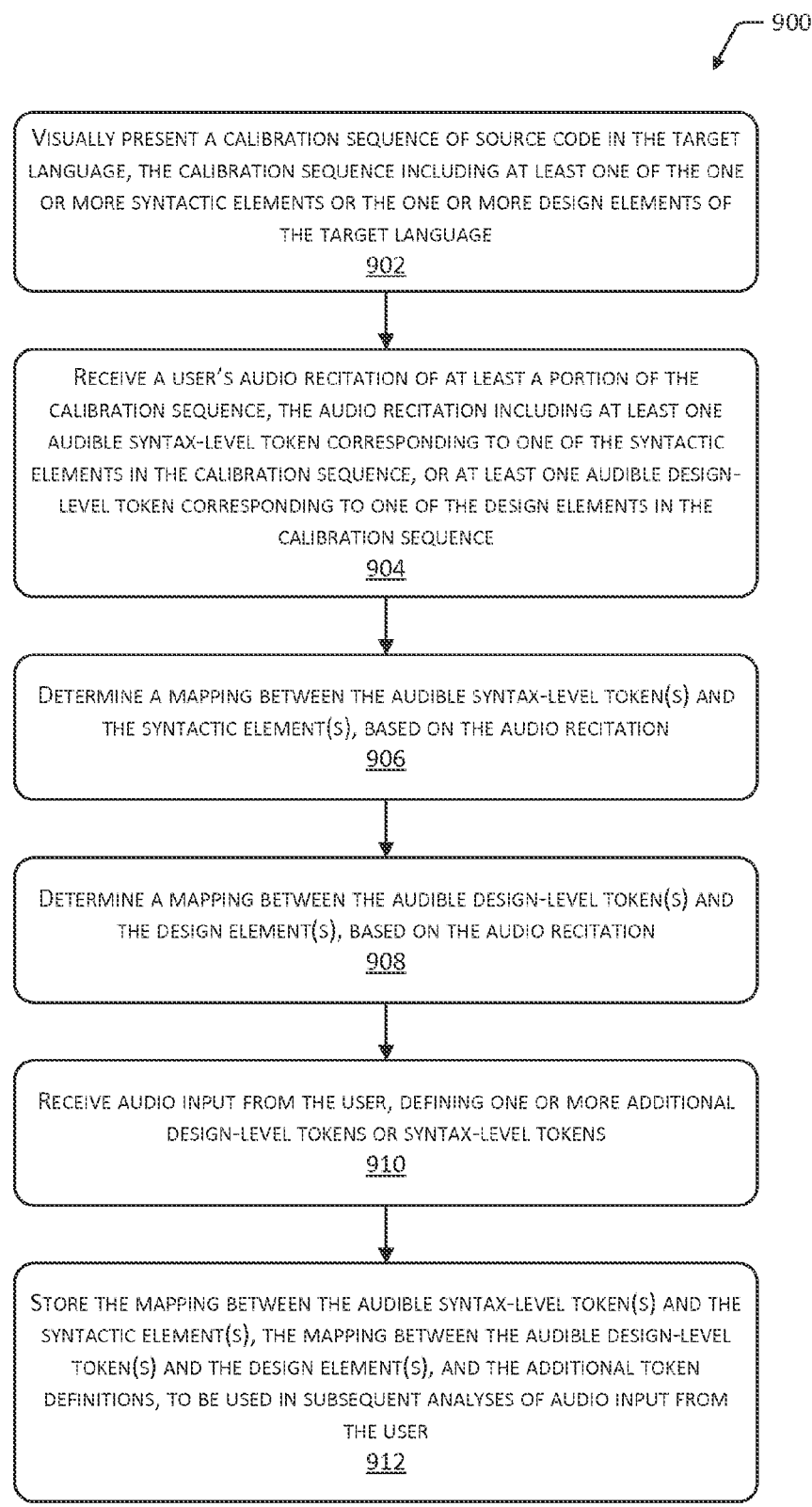
FIG. 9 depicts a flow diagram of a process for calibrating the audio input based on a user's recitation of a calibration sequence that includes one or more design elements or one or more syntactic elements.

FIG. 9 depicts a flow diagram 900 of a process for calibrating the audio input 106 based on a recitation of a calibration sequence including one or more design elements 118 or one or more syntactic elements 120. Operations included in the process may be performed by the audio input recognition module 108, the token analysis module 114, the development environment module 122, the output generation module 126, or by other modules of the user device 102.

At 902, a calibration sequence may be visually presented to the user 104. In some implementations, the calibration sequence may be a sequence of text that includes one or more syntactic elements of the target programming language, or one or more design elements. In some cases, the calibration sequence may be an example of source code in the target programming language. The user 104 may be prompted to read the calibration sequence, using his or her own preferred terms for the visually presented syntactic or design elements. For example, the user 104 may be shown a "{" character, and the user 104 may speak "left curly brace," "left curly bracket," or "open curly bracket" to describe that character.

At 904, the audio recitation of the user 104, reciting at least a portion of the calibration sequence, may be received. The audio recitation may include at least one audible syntax-level token corresponding to a syntactic element shown in the calibration sequence. The audio recitation may also include at least one audible design-level token corresponding to a design element shown in the calibration sequence.

At 906, based on an analysis of the user's recitation, a mapping may be determined to map each user-recited syntax-level token to a syntactic element that was presented in the calibration sequence.

At 908, based on the analysis of the user's recitation, a mapping may be determined to map each user-recited design-level token to a design element that was presented in the calibration sequence.

At 910, audio input 106 may be received from the user 104, specifying one or more additional design-level tokens 110, or one or more additional syntax-level tokens 112. In some cases, this information may define the additional tokens by providing the user's mapping of one or more design-level tokens or syntax-level tokens to one or more design elements or syntactic elements respectively. In this way, implementations may enable a user 104 to customize the token recognition.

At 912, the mappings determined at 906 and 908 may be stored in the token mapping data 116. In some cases, the token mapping data 116 may be associated with the particular user 104 in storage on the user device 102, and employed during subsequent analyses of the audio input 106 received from that user 104. Through such calibration operations, implementations may enable the accurate generation of the source code 306 in cases where different users 104 may employ different pronunciations or different terminology to describe similar syntactic elements 120 or similar design elements 118.

Although the implementations described herein employ two types of information, design-level information and syntax-level information, for describing a structured language sequence such as the computer program 124, implementations are not so limited. Implementations support any number of information levels for the audio input 106. Further, implementations are not limited to supporting speech as a form of the audio input 106. In some cases, other types of the audio input 106 may be supported by implementations, including tonal patterns (e.g., musical input), rhythmic patterns (e.g., drum beats), or other types of audio information. For example, the user 104 may sing their input, with the words as well as pitch, rhythm, or pauses conveying information. Similarly, the audio output 128 may respond to various types of audio input 106 in kind, outputting tonal or rhythmic patterns, or other types of audio information. In this way, some implementations provide a paradigm for software development that may be more akin to a conversation or a musical duet between a developer and a development environment, instead of or in addition to the keyboard-based source code entry employed in a traditional software development scenario.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
   receiving a first audio input describing a computer program;
   employing an audio input recognition module to recognize a first audio command in the first audio input, the first audio command indicating a design mode;
   analyzing the first audio input to determine one or more design-level tokens associated with design elements to be included in the computer program, the design elements including one or more of a function, a class, a transform, or a design pattern to be included in the computer program, the audio input recognition module executing on a computing device, wherein the one or more design-level tokens are separate from the first audio command;
   determining correspondence between the one or more design-level tokens and token mapping data indicative of the design elements;
   providing audio output including feedback data based on the correspondence between the one or more design-level tokens and the token mapping data indicative of the design elements;
   analyzing the first audio input to determine an arrangement between the design elements to be included in the computer program, the arrangement being at least partly specified in the first audio input;
   employing the audio input recognition module to recognize a second audio command in the first audio input, the second audio command indicating a switch from the design mode to a code entry mode;
   receiving a second audio input describing source code for at least one of the design elements;
   analyzing the second audio input to determine one or more syntax-level tokens associated with one or more syntactic elements of a target programming language, wherein the one or more syntax-level tokens are separate from the second audio command and are further separate from the one or more design-level tokens;
   determining correspondence between the one or more syntax-level tokens and token mapping data indicative of the syntactic elements;
   providing audio output including feedback data based on the correspondence between the one or more syntax-level tokens and the token mapping data indicative of the syntactic elements; and
   generating the computer program in the target programming language on the computing device, the computer program including:
      the design elements in the arrangement determined based on the analyzing of the first audio input; and
      the source code for the at least one of the design elements, the source code including the one or more syntactic elements.

2. The method of claim 1, further comprising:
   presenting audio output that describes at least a portion of the computer program including at least one of the design elements;
   presenting, concurrently with the audio output, at least one audio context indicator that identifies a development context for the at least one of the design elements currently being described in the audio output, the at least one audio context indicator including one or more of:
   a pitch of a voice, the pitch corresponding to the development context;
   an accent of a voice, the accent corresponding to the development context;
   a rhythm of a voice, the rhythm corresponding to the development context;
   music from a genre corresponding to the development context;
   one or more tones at one or more frequencies corresponding to the development context; or
   a particular piece of music corresponding to the development context.

3. The method of claim 1, wherein one or more of the first audio input or the second audio input includes at least one audio context indicator that identifies a characteristic of one or more of the design elements or the syntactic elements the at least one audio context indicator including one or more of:
   a tone, a pitch, a rate, or an inflection of audible speech;
   a pause in the audible speech; or
   a non-lexical vocable.

4. The method of claim 1, further comprising:
   storing a transcript of one or more of the first audio input or the second audio input;
   determining a second target programming language for generating a second computer program;
   determining the design-level tokens and the syntax-level tokens from the transcript; and
   generating at least a portion of the second computer program in the second target programming language based on the design-level tokens and syntax-level tokens determined from the transcript.

5. A system, comprising:
   at least one memory storing computer-executable instructions; and at least one processor in communication with the at least one memory, the at least one processor configured to access the at least one memory and execute the computer-executable instructions to:
    receive audio input describing a computer program to be generated in a target language;
    receive an audio command in the audio input, the audio command indicating a design mode;
    responsive to the audio command, analyze the audio input to determine from the audio input one or more audio design-level tokens associated with elements to be included in the computer program, wherein the one or more audio design-level tokens are separate from the audio command in the audio input;
    analyze the audio input to determine an arrangement between the elements to be included in the computer program;
    generate at least a portion of the computer program in the target language, the computer program including the elements in the determined arrangement;
    present audio output describing the at least a portion of the computer program that includes at least one of the elements; and
    present an audio context indicator concurrent with the audio output, the audio context indicator identifying a development context for the at least one of the elements currently being described in the audio output.

6. The system of claim 5, wherein the elements include one or more of a function, a class, a transform, or a design pattern to be included in the computer program.

7. The system of claim 5, wherein the audio output includes a voice and the audio context indicator includes one or more of:
    one or more tones or a sequence of tones, at one or more frequencies that identify the development context;
    a pitch of the voice, the pitch corresponding to the development context;
    an accent of the voice, the accent corresponding to the development context; or
    a rhythm of the voice, the rhythm corresponding to the development context.

8. The system of claim 5, wherein the audio context indicator includes one or more of:
    music from a genre corresponding to the development context, the music being output concurrently with the audio output;
    one or more tones at one or more frequencies corresponding to the development context, the one or more tones being output concurrently with the audio output; or
    a particular piece of music corresponding to the development context, the particular piece of music being output concurrently with the audio output.

9. The system of claim 5, further comprising computer-executable instructions to:
    store a transcript of the audio input;
    determine a second target language for generating a second computer program;
    determine the audio design-level tokens from the transcript; and
    generate at least a portion of the second computer program in the second target language based on the audio design-level tokens determined from the transcript.

10. The system of claim 5, further comprising computer-executable instructions to:
    determine one or more input context indicators from the audio input, wherein the one or more input context indicators are separate from the audio design-level tokens, wherein the one or more input context indicators include one or more of:
        a tone, a pitch, a rate, or an inflection of audible speech;
        a pause in the audible speech; or
        a non-lexical vocable; and
    provide the computer program with one or more elements corresponding to the one or more input context indicators.

11. The system of claim 5, wherein the at least one processor is further configured to:
    receive a first audio command indicating a design mode, the audio design-level tokens including one or more design-level tokens corresponding to elements of the computer program;
    receive a second audio command in the audio input, the second audio command indicating a code entry mode for source code input; and
    responsive to the second audio command, analyze the audio input to determine one or more syntax-level tokens associated with one or more syntactic elements of the target language, wherein the one or more syntax-level tokens are separate from the second audio command in the audio input and are further separate from the one or more design-level tokens.

12. The system of claim 11, wherein the at least one processor is further configured to:
    generate the computer program in the target language, the computer program including:
    the elements in the arrangement determined based on the analyzing of the audio input; and
    source code for the at least one of the elements, the source code including the one or more syntax-level tokens.

13. The system of claim 12, wherein the at least one processor is further configured to:
    perform at least one action, including one or more of compiling, interpreting, linking, or executing the computer program; and
    present the audio output that describes at least one error in performing the at least one action.

14. The system of claim 5, wherein the at least one processor is further configured to:
    provide audio feedback requesting additional information regarding at least one unidentified audio token in the audio input; and
    receive additional audio input at least partly clarifying the at least one unidentified audio token, in response to the audio feedback.

15. One or more non-transitory computer-readable media storing instructions which, when executed, instruct at least one processor to perform actions comprising:
    receiving audio input describing a sequence in a target language that is not a natural language;
    analyzing the audio input to recognize an audio command indicating that one or more audio tokens are included in a portion of the audio input subsequent to the audio command;
    determining one or more input context indicators from the audio input, wherein the one or more input context indicators correspond to a characteristic of the sequence in the target language;
    analyzing the audio input to identify, in the audio input, the one or more audio tokens from the audio input;
    determining one or more elements of the target language, based on the identified one or more audio tokens;

generating the sequence in the target language, the sequence including the characteristic and the one or more elements; and presenting audio output describing at least a portion of the sequence.

16. The one or more non-transitory computer-readable media of claim 15, the actions further comprising presenting an audio context indicator concurrent with the audio output, the audio context indicator identifying a development context for the at least one of the elements currently being described in the audio output, the audio context indicator including one or more of:
- a pitch of a voice, the pitch corresponding to the development context;
- an accent of a voice, the accent corresponding to the development context;
- a rhythm of a voice, the rhythm corresponding to the development context;
- music from a genre corresponding to the development context;
- one or more tones at one or more frequencies corresponding to the development context; or
- a particular piece of music corresponding to the development context.

17. The one or more non-transitory computer-readable media of claim 15, the actions further comprising:
- storing a transcript of the audio input;
- determining a second target language for generating a second computer program;
- determining the audio tokens from the transcript; and
- generating at least a portion of the second computer program in the second target language based on the audio tokens determined from the transcript.

18. The one or more non-transitory computer-readable media of claim 15, the actions further comprising:
- visually presenting a calibration sequence in the target language, the calibration sequence including at least one of the one or more elements of the target language;
- receiving an audio recitation of at least a portion of the calibration sequence, the audio recitation including at least one of the one or more audio tokens corresponding to the at least one of the one or more elements included in the calibration sequence; and
- determining a mapping between the at least one of the one or more audio tokens and the at least one of the one or more elements; and
- wherein the determining of the one or more elements of the target language further includes applying the determined mapping.

19. The one or more non-transitory computer-readable media of claim 15, wherein at least one of the one or more audio tokens identifies an element that specifies a hierarchical level in the sequence.

20. The one or more non-transitory computer-readable media of claim 15, wherein at least one of the one or more audio tokens identifies an element that specifies a beginning or an end of a statement in the sequence.

* * * * *